July 22, 1924.
W. B. WESCOTT
1,502,077
CINEMATOGRAPHIC MACHINE
Original Filed Sept. 11, 1916    3 Sheets—Sheet 2
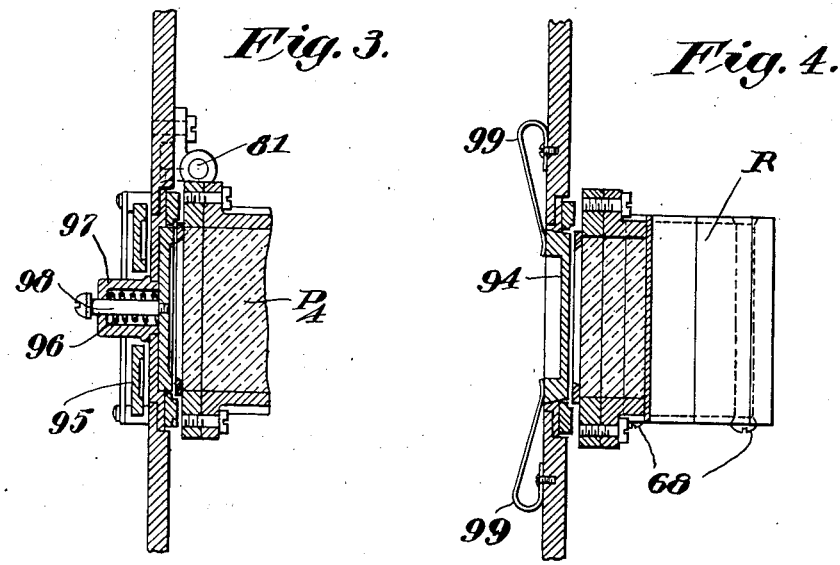
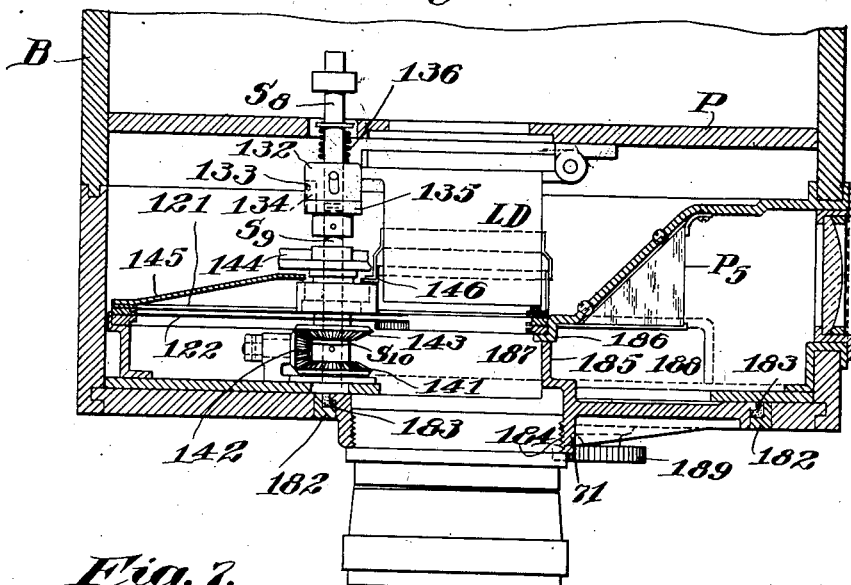
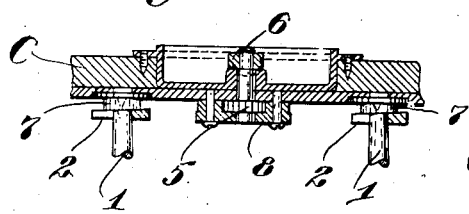
Inventor
William B. Wescott
by Roberts Roberts Cushman
his Attorneys

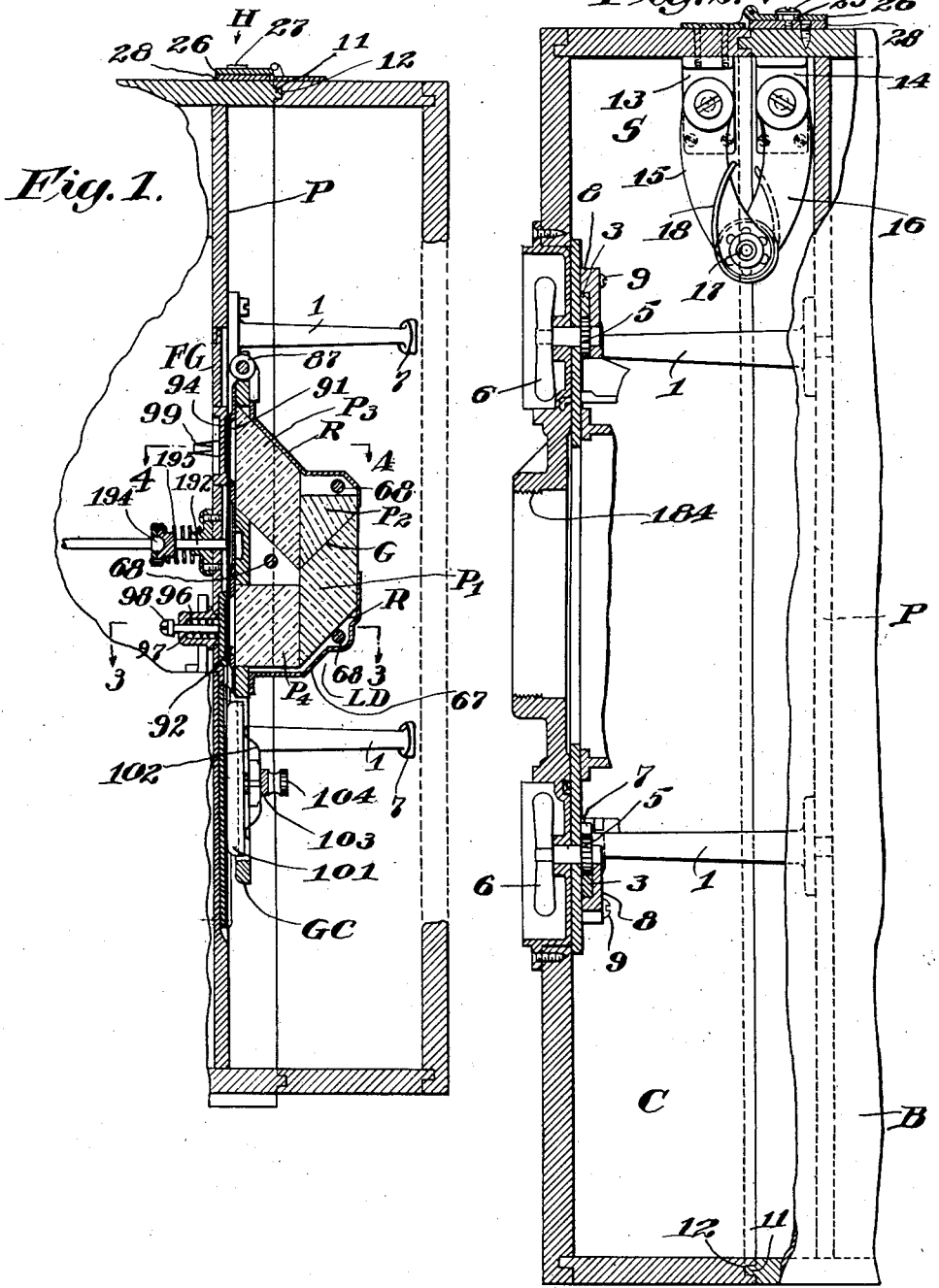

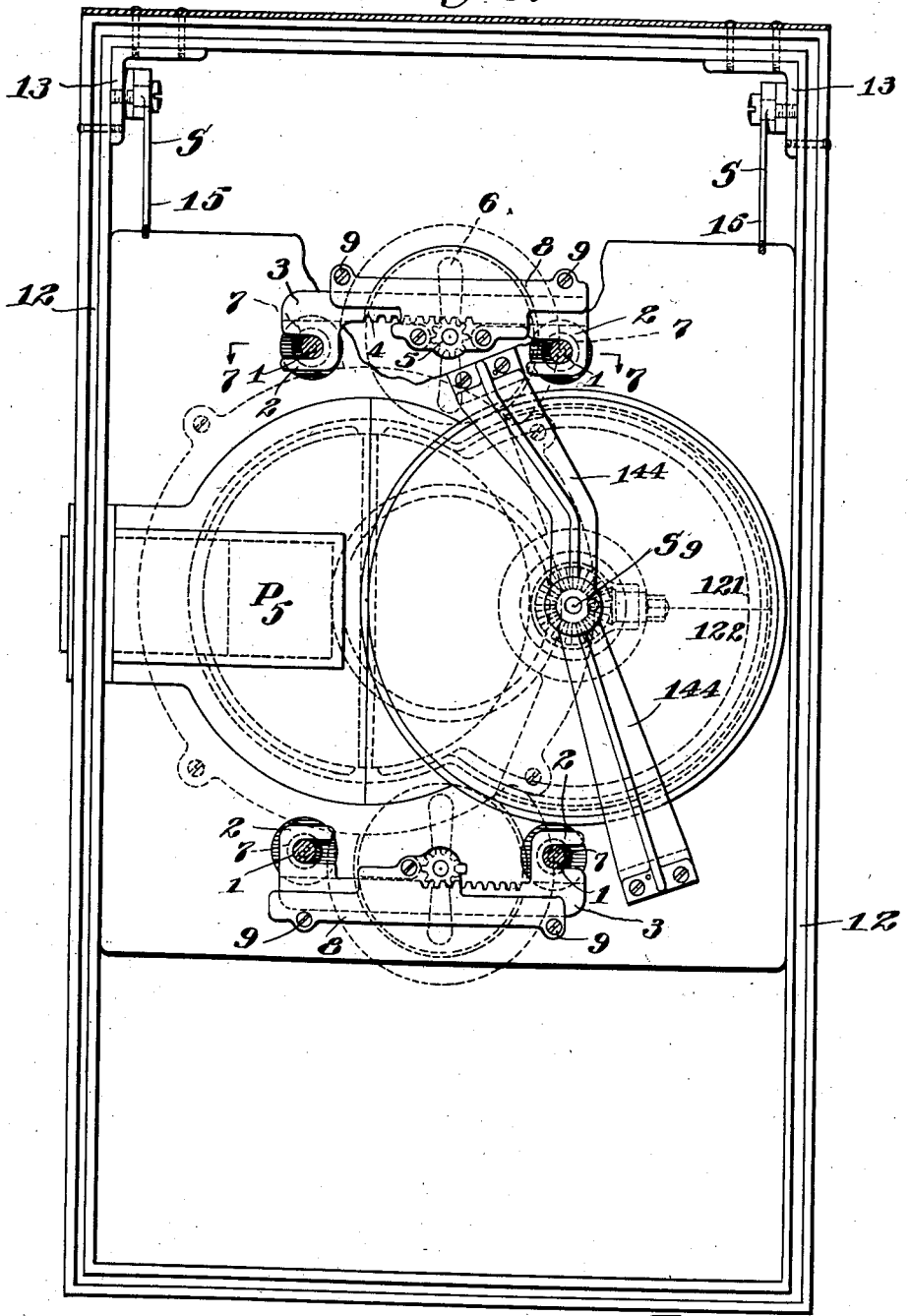

Patented July 22, 1924.

1,502,077

UNITED STATES PATENT OFFICE.

WILLIAM BURTON WESCOTT, OF WELLESLEY, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CINEMATOGRAPHIC MACHINE.

Original application filed September 11, 1916, Serial No. 119,377. Divided and this application filed April 25, 1921. Serial No. 464,205.

*To all whom it may concern:*

Be it known that I, WILLIAM BURTON WESCOTT, citizen of the the United States of America, and resident of Wellesley, in the county of Norfolk and State of Massachusetts, have invented new and useful Improvements in Cinematographic Machines, of which the following is a specification.

This invention relates to optical apparatus, and more particularly to a motion picture camera adapted to take a plurality of simultaneous pictures of the same scene from the same point of view, this being a division of my prior application Serial No. 119,377, filed September 11, 1916 (patent No. 1,383,357, granted July 5, 1921).

The principal object of the present invention is to provide means whereby parts of the optical system of a camera or the like may be supported upon the cover (or other portion of the apparatus movable relatively to the fixed portion) in accurate alinement with the optical path or paths within the camera or the like. Other objects are to support different parts of the optical system upon different portions of the apparatus movable relatively to each other and to maintain the parts in exact relationship relatively to each other in use. Further objects are so to support the different parts that they are normally held in close proximity and at the same time are readily accessible.

Other objects attained by my invention will be apparent from the following description and the accompanying drawings, in which—

Figure 1 is a vertical longitudinal section through the center of a camera embodying the present invention.

Figure 2 is a vertical section of the cover, parts being omitted.

Figure 3 is a horizontal section of the film gate taken on line 3—3 of Fig. 1.

Figure 4 is a horizontal section of the film gate taken on line 4—4 of Fig. 1.

Figure 5 is a horizontal section through the forward portion of the camera, showing the optical elements in elevation;

Figure 6 is an elevation of the rear of the cover; and

Figure 7 is a section of the cover locking means taken on the line 7—7 of Fig. 6.

The camera mechanism is housed within a box B of ordinary construction having a cover C pivoted to the top of the box to swing upwardly. The box is divided into two compartments by the partition P, which carries most of the camera mechanism on its front and rear sides. Members 1 are secured to the front of the partition and cooperate with slotted bayonet catches 2 mounted on the inside of the cover, as shown in elevation in Fig. 6. The upper and lower pairs of bayonet members 2, respectively, are connected together by members 3 provided with teeth 4 forming a rack cooperating with the pinion 5 which is controlled by a handle 6 on the outside of the cover. As shown in Fig. 7, the members 1 projecting from the front of the partition P are provided with heads 7 tapered on the rear side to engage with the inclined faces of the bayonet members 2 whereby the cover may be securely and accurately locked in position relative to the camera box, thus positioning the lenses carried by the cover in accurate alinement with the film gate openings. Members 8 secured to the cover by means of screws 9 are provided to form guides for the reciprocating rack members 3. The box B is provided with a tongue 11 extending around the front edge which cooperates with a groove 12 on the cover to form a light tight connection between the box and the cover.

As shown in Fig. 2, the hinge mechanism H for pivotally connecting the cover C with the box B comprises slots 25' in the hinge member 26' cooperating with screws 27' threaded into plate 28', which, in turn, is screwed to the box B. The screws 27' have shoulders contacting with plate 28' whereby the heads of the screws may be so positioned as to permit the hinge member 26' to slide freely thereunder. When the cover C is locked into position with relation to the box B by the locking means above described, the pin and slot connection permits the cover to move bodily to or from the box. Thus, inasmuch as the cover may be accurately positioned and rigidly maintained in position by the locking means alone, the hinges need not be made with a great degree of precision. Furthermore, when the box and cover are made of wood, shrinkage and expansion of these parts are likely to occur and the pin and slot connection provides for such contingency. Cushioning mechanism S, as shown in Fig. 21, may be provided to prevent the cover from being too quickly closed, as for example, from being violently closed by gravity. Suitable mechanism for this purpose comprises members 13 and 14 respectively secured to the cover and box and having pivoted thereto arms 15 and 16 which are pivoted together at 17, the pivotal connection 17 being surrounded by a coil spring 18 cooperating with the arms 15 and 16.

The film feeding mechanism shown in my prior application above referred to forms no part of the present invention and is, therefore, not described in detail herein, this mechanism forming the subject matter of copending application Serial No. 464,204 filed on even date herewith.

The film-gate mechanism comprises a film-gate FG and a film-gate cover GC hinged to swing outwardly on pivots 81. Rollers 87 are mounted on the upper end of the film-gate cover to extend over the film-gate passage a slight distance to the rear of the forward face thereof and to engage the margins of the forward side of the film as it enters the film-gate. A presser foot 101 is mounted on the lower end of the film-gate cover to engage the forward side of the film along each margin thereof and to urge the film against the rearward side of the film passage. The presser foot 101 is urged toward the rearward side of film-gate passage by means of springs 102 mounted upon the cross-piece 103 carried by the film-gate cover and bearing at their ends against the presser foot. A thumb-screw 104 passes through an opening in the cross-piece 103, and is threaded into an opening in the presser foot, so that the movement of the foot toward the rear face of the film-gate passage, due to the pressure of the springs, may be limited.

As above stated, the camera herein disclosed is of the multiplex type, and is provided with light-dividing means LD mounted on the film gate cover in alinement with the main lens opening in the cover to divide the beam of light issuing from the camera lens into two similar beams and to project these two beams through openings 91 and 92 in the film gate cover to separate picture spaces on the film. The light-dividing means preferably comprises a plurality of prisms $P_1$, $P_2$, $P_3$ and $P_4$ (Fig. 1) secured within the casing 67 by means of bolts 68 and a light-dividing grid G positioned between prisms $P_1$ and $P_2$ for transmitting part of the light incident thereto and for reflecting the part of the incident light. The prisms have reflecting surfaces R for projecting the divided beam through the film gate apertures 91 and 92, and the prisms are so disposed that the paths for the two divided parts of the beam through the prisms are equal in length.

Presser members 94 and 95 are mounted directly behind the film-gate cover openings 91 and 92 to hold the film against the forward side of the film passage while being exposed. The front face of each of the presser members has a recess substantially coextensive with the corresponding picture aperture having a marginal raised portion 93 for engagement with the portion of the film surrounding the picture portion. As shown in Fig. 4, the presser member 94 is urged forwardly by means of springs 99 mounted on either side of the member. The lower presser member 95, shown in Figs. 1 and 3, is arranged to be urged forwardly by a coiled compression spring 96 surrounding the pin 98 which is threaded into the presser member, and a housing 97 is mounted on the rear of the film-gate to enclose the compression spring and to form a rear bearing surface therefor.

Owing to the fact that the rollers 87 at the top of the film-gate and presser foot 101 at the bottom of the film-gate are mounted to extend to the rear of the forward face of the film passage, the sensitized coating on the forward side of the film is prevented from contacting with the passage during movement of the film. While the presser members 94 and 95 maintain the film in contact with the front of the passage, during periods of film rest, the forces exerted on the presser members by springs 96 and 99 are comparatively small, and the tension produced in the portion of the film in the film-gate passage as the film is rapidly advanced is sufficient to overcome the force of the presser member springs whereby the film is held against the forward side of the film gate passage substantially only during the periods of film rest.

The shutter mechanism comprising shutters 121 and 122 is mounted on the rear face of the cover C as shown in Figs. 5 and 6. Shutter 121 is mounted on a shaft $S_9$, and shutter 122 is mounted on a shaft $S_{10}$, which surrounds and is adapted to rotate upon the shaft $S_9$, the shaft $S_9$ being driven by shaft $S_8$. An automatic connecting device is provided between shafts $S_8$ and $S_9$ comprising a head 132 mounted to slide longitudinally on the shaft $S_8$ and provided with a hole 133 cooperating with a pin 134 on head 135 which is rigidly mounted on the end of the shaft $S_9$. A spring 136 is provided to urge the head 132 forwardly into the position shown in Fig. 5. When the cover is closed the pin 134 engages the head 132, in the event that the pin does not register with the hole 133 therein, and forces the head backwardly against the pressure of the spring 136 until the shaft $S_8$ is caused to rotate, at which time the head will spring into normal position.

The bevel gear 141 mounted on the end of shaft $S_9$ cooperates with a bevel gear 142 mounted on the inside face of the cover, the latter also cooperating with bevel gear 143 secured to the shaft $S_{10}$. Thus, when the shaft $S_9$ is rotated in one direction, the shutter 121 rotates therewith in the same direction, and the shutter 122 mounted on shaft $S_{10}$ is driven in the opposite direction by means of the bevel gears. The two shutters rotating in opposite directions shutter the lens aperture simultaneously from opposite sides, so that the aperture is closed when the two shutters begin to overlap after each has passed half way across the lens opening. Thus, the aperture is either closed or opened in one-half the time required for the operation with the ordinary single rotating shutter. A bearing for shaft $S_9$ is carried by brackets 144 secured to the rear face of the cover, and a light-tight casing 145 is provided over the rear of the shutter mechanism having an opening 146 therein to allow the passage of light from the lens to the film gate.

In the preferred embodiment of my invention a single lens is employed at times as the main image forming means and at other times as an auxiliary image forming means for the finder mechanism. As shown in Figs. 5 and 6, the optical paths of the camera and the finder have respective parallel portions arranged adjacent to each other and at these adjacent portions I preferably mount the camera lens so that it can be rotated into alinement either with the light dividing means LD comprising a part of the main optical path or with the totally reflecting prism $P_5$ comprising means to reflect light to the finder F. Suitable means for changing the position of the lens comprises a turret T rotatably mounted in bearing 182 having light-tight packing 183. The turret has a threaded opening 184 to receive the lens and a partition 185 on the rear central portion thereof cooperating with a member 186 to prevent light from passing between the main chamber 187 and the auxiliary chamber 188 when the turret is in either operative position, the partition 185 occupying substantially the position shown in the drawings when the lens is in alinement with either of the optical paths. A thumb screw 189 may be provided to lock the turret in either of its operative positions, and ribs 190 are preferably provided on the outer face of the turret to add rigidity thereto. This turret arrangement is claimed in my copending application Serial No. 464,206 filed on even date herewith.

I claim:

1. Optical apparatus comprising a film gate, a film gate cover having a plurality of spaced exposure apertures therein, light dividing means mounted on said cover to divide a beam of light into a plurality of similar beams and means to project the divided parts of the beam through said apertures respectively.

2. Optical apparatus comprising a camera box, a film gate mounted therein, a film gate cover having a plurality of exposure apertures therein, a cover for said box, means on said cover for admitting a beam of light, and means mounted on said film gate cover in alinement with said first means for dividing the beam of light into a plurality of similar beams and projecting the divided parts of the beam through said apertures.

3. Optical apparatus comprising a housing carrying a portion of the optical system, a cover for said housing carrying another portion of the optical system, means on said housing and cover cooperating with each other when the cover is closed for positioning said housing and cover both with relation to their distance apart and with relation to the alinement of said portions of the optical system, and means cooperating with said positioning means for locking said cover member in position.

4. Optical apparatus comprising a housing carrying a portion of the optical system, a cover for said housing carrying another portion of the optical system, means on said housing and cover cooperating with each other when the cover is closed for positioning said housing and cover both with relation to their distance apart and with relation to the alinement of said portions of the optical system, said positioning means on said housing and cover respectively having cooperating tapered surfaces for locking said cover in position.

5. Optical apparatus comprising a housing carrying a portion of the optical system, a cover for said housing carrying another portion of the optical system, means mounted on said housing and cover on opposite sides of the axis of said optical system cooperating with each other when the cover is closed for positioning said housing and cover both with relation to their distance apart and with relation to the alinement of said portions of the optical system, and means cooperating with said positioning means for locking said cover in position.

6. Optical apparatus comprising a housing carrying a portion of the optical system, a cover for said housing carrying another portion of the optical system, means on said housing and cover cooperating with each other when the cover is closed for positioning said housing and cover both with relation to their distance apart and with relation to the alinement of said portions of the optical system, said positioning means on said housing having a tapered surface, means on the inside of said cover having a tapered surface cooperating with said first tapered surface for locking said cover in position, and means on the outside of said cover for actuating said last means.

7. Optical apparatus comprising a housing carrying a portion of the optical system, a cover for said housing carrying another portion of the optical system, means on said housing and cover cooperating with each other when the cover is closed for positioning said housing and cover both with relation to their distance apart and with relation to the alinement of said portions of the optical system, a rack and pinion for actuating said last means, and means on the outside of said cover for actuating said rack and pinion.

8. Optical apparatus comprising a housing carrying a portion of the optical system, a cover for said housing carrying another portion of the optical system, positioning means projecting from said housing, means on the end of said positioning means having a front bearing surface and a rear tapered surface and means on said cover cooperating with said last means when the cover is closed to lock said housing and cover both with relation to their distance apart and with relation to the alinement of said portions of the optical system.

9. Optical apparatus comprising a film gate and a film gate cover spaced therefrom to provide a chamber, said cover having a plurality of spaced exposure apertures therein and light dividing means carried by the cover and disposed within the chamber to divide a beam of light into a plurality of similar beams, and means to project the divided parts of the beam through said apertures respectively.

10. Optical apparatus comprising a housing carrying a portion of the optical system, a cover for said housing carrying another portion of the optical system, means hingedly connecting the housing and cover for relative pivotal and for relative sliding movement, and interfitting means on the cover and housing for securing the parts against both pivotal and sliding movement.

11. Optical apparatus comprising a housing carrying a portion of the optical system, a cover for said housing carrying another portion of the optical system, and means on said housing and cover cooperating with each other when the cover is closed for positioning said housing and cover both with relation to their distance apart and with relation to the alignment of said parts of the optical system, said means including connecting members secured to one of the parts and formed with heads for engagement with the other of the parts, and locking devices carried by the latter part for interfitting engagement with the heads.

12. Optical apparatus comprising a housing carrying a portion of the optical system, a cover for said housing carrying another portion of the optical system, means on said housing and cover cooperating with each other when the cover is closed for positioning said housing and cover both with relation to their distance apart and with relation to the alignment of said parts of the optical system, said positioning means on said housing and cover including connecting members on one of the parts having heads with transversely extending tapered faces, locking members on the other of the parts having tapered head engaging portions, and means for relatively shifting the parts to produce a wedging engagement between the tapered surfaces of the heads and locking members.

Signed by me at Boston, Massachusetts, this 18th day of April, 1921.

WILLIAM BURTON WESCOTT.